United States Patent
Knudsen

(10) Patent No.: US 6,255,942 B1
(45) Date of Patent: Jul. 3, 2001

(54) WIRELESS COMMUNICATIONS PLATFORM

(75) Inventor: Eugene R. Knudsen, Brewster, NY (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/044,007

(22) Filed: Mar. 19, 1998

(51) Int. Cl.[7] ............................ G08B 29/00; G08B 1/08
(52) U.S. Cl. ...................... 340/506; 340/539; 340/531; 340/825.36; 379/37
(58) Field of Search ................................... 340/506, 531, 340/539, 825.36, 825.49; 379/37–40

(56) References Cited

U.S. PATENT DOCUMENTS

| | | | |
|---|---|---|---|
| 4,656,463 | * 4/1987 | Anders et al. | 340/541 |
| 4,750,197 | * 6/1988 | Denekamp et al. | 340/825.35 |
| 5,223,844 | * 6/1993 | Mansell et al. | 342/357 |
| 5,249,218 | 9/1993 | Sainton | 379/59 |
| 5,309,351 | 5/1994 | McCain et al. | 364/132 |
| 5,367,563 | 11/1994 | Sainton | 379/98 |
| 5,452,291 | 9/1995 | Eisenhandler et al. | 370/54 |
| 5,495,484 | 2/1996 | Self et al. | 370/110.1 |
| 5,504,491 | * 4/1996 | Chapman | 342/357 |
| 5,508,736 | * 4/1996 | Cooper | 348/148 |
| 5,515,043 | * 5/1996 | Berard et al. | 340/426 |
| 5,528,660 | 6/1996 | Heins et al. | 379/21 |
| 5,533,093 | 7/1996 | Horton et al. | 379/21 |
| 5,555,258 | 9/1996 | Snelling et al. | 370/29 |
| 5,583,912 | 12/1996 | Schillaci et al. | 379/21 |
| 5,596,501 | * 1/1997 | Comer et al. | 340/825.35 |
| 5,608,780 | 3/1997 | Gerszberg et al. | 379/58 |
| 5,612,990 | 3/1997 | Meier et al. | 379/58 |
| 5,623,495 | 4/1997 | Eng et al. | 370/397 |
| 5,640,155 | 6/1997 | Springer | 340/870 |
| 5,654,747 | 8/1997 | Ottesen et al. | 348/12 |
| 5,717,379 | * 2/1998 | Peters | 340/539 |
| 5,917,405 | * 6/1999 | Joao | 340/426 |
| 5,986,543 | * 11/1999 | Johnson | 340/426 |

* cited by examiner

Primary Examiner—Donnie L. Crosland

(57) ABSTRACT

A system and a method in which a sensor interface device receives a sensor signal corresponding to a monitored parameter. A processor is responsive to the sensor signal by storing information relating to the monitored in a memory and by generating a dialing signal when the monitored parameter equals a predetermined value. A transceiver is responsive to the dialing signal by establishing a two-way wireless communications link with a telecommunications network.

65 Claims, 2 Drawing Sheets

WIRELESS COMMUNICATIONS PLATFORM

BACKGROUND OF THE INVENTION

1. Field of the Invention

The present invention relates to the field of telecommunications. More particularly, the present invention relates to a communications platform integrating autonomous logic functions with a standard sensor interface, and to an associated method.

2. Description of the Related Art

A conventional premises security system remotely monitors a premises and when, for example, a break-in condition is detected, dials a predetermined telephone number for establishing a wireline communications link to a central location for reporting the detected break-in condition. Such a conventional security system provides a communications platform that establishes the wireline communications link and accepts sensor inputs from several different types of sensors, such as Hall-effect sensors, infrared sensors and audio sensors. A conventional security system can also be configured for accepting sensor inputs from other types of sensors, such as smoke detectors and water level (flood) detectors, for monitoring other conditions that can occur at the premises that are, for example, life-threatening and/or may cause physical damage.

A conventional vehicle security system similarly accepts different sensor inputs for detecting a break-in and/or a theft of a vehicle. Most conventional vehicle security systems provide an audible alarm for deterring a break-in or theft. One known vehicle security system transmits a wireless radio frequency signal in response to receiving a wireless radio frequency signal transmitted by a law enforcement agency. When it is determined that the vehicle in which such a vehicle security system is installed is stolen, the radio frequency signal transmitted by the security system enables law enforcement agencies to more easily locate the stolen vehicle.

While a conventional security system monitors conditions of an entity, such as a premises or a vehicle, and provides a communications platform that is capable of forming a communications link with a central location, such a conventional security system must be specifically configured for the entity that is being monitored and cannot be easily reconfigured for monitoring another entity. For example, a security system intended for monitoring a specific premises, such as a house, cannot be easily reconfigured for monitoring a parking lot or for providing graffiti and vandalism control. In this regard, conventional security systems do not provide portable functionality.

Further, the communications platform aspect of a conventional security system is capable of establishing a one-way wireline communications link to a central location for alerting a central location of a detected condition. Consequently, when an alarm condition is communicated to the central location, personnel must then be dispatched for ascertaining the true nature of the detected condition. Further, in the case of a wireline communications link, the link can be defeated by severing the wireline link, in which case any such alarm condition is not communicated to the central location. In the case of the conventional vehicle security that transmits a radio frequency signal, the wireless communications link to a receiver that is in close enough proximity to receive the radio frequency signal, not to a specific receiver that is dialed by the conventional security system.

Consequently, what is needed is a communications system that establishes a two-way wireless communications link with a predetermined location when a predetermined condition or set of conditions are detected. Further, what is needed is a communications system that can be easily reconfigured for monitoring different entities, thus providing portable functionality.

SUMMARY OF THE INVENTION

The present invention provides a communications system that integrates a communications platform, autonomous logic functions and a standard sensor interface for providing a system that establishes a two-way wireless communications link with a selected predetermined location when a predetermined condition or set of conditions are detected. The selected predetermined location can be a central location, a remote location or can be a mobile transceiver, such as a cellular telephone or a personal communications system (PCS) terminal. According to the invention, the predetermined condition or set of conditions can be fixed, dynamic, calculated and/or based on Boolean and/or fuzzy logic. Further, the present invention can be easily reconfigured for monitoring different entities, such as a premises, a high-value asset, traffic, environmental conditions at a location, for example, thus providing portable functionality. Further still, the present invention is portable.

The advantages of the present invention are provided by a system and a method in which a sensor interface device receives a sensor signal corresponding to a monitored parameter. A processor is responsive to the sensor signal by storing information relating to the monitored parameter in a memory and by generating a dialing signal when the monitored parameter equals a predetermined value. A transceiver is responsive to the dialing signal by establishing a two-way wireless communications link with a telecommunications network. According to one aspect of the present invention, the information stored in the memory relating to the monitored parameter is sent over the communications link. Additionally, information, such as program information executed by the processor, announcement information and/or image information, can be received over the communications link and stored in the memory. The dialing signal can be generated periodically for sending the information relating to the monitored parameter stored in the memory over the two-way communications link.

Preferably, the wireless two-way communications link is a cellular network communications link, a personal communications system (PCS) communications link or an ISDN link that provides an audio, a video and/or a data link. In this regard, the present invention can be connected to a transceiver that establishes the audio, video and/or data link. Alternatively, the wireless communications link can be a satellite system link.

BRIEF DESCRIPTION OF THE DRAWING

The present invention is illustrated by way of example and not limitation in the accompanying figures in which like reference numerals indicate similar elements and in which.

DETAILED DESCRIPTION

The present invention provides a communications platform that can autonomously monitor a remote location and establish a two-way wireless communications link for different types of media, such as a cellular telephone communications link or a PCS communications link. The present invention monitors a remote entity, such as a physical space, a machine, a process, a roadway, a pathway (curved or linear), a production line, etc., using a variety of input sensors that are capable of sensing a selected aspect or parameter of the entity that is being monitored. As the entity is being monitored, the present invention is capable of recording data for subsequent transmission to a selected predetermined location, such as a central location, a remote location or a mobile transceiver. When a predetermined condition or set of conditions are detected, based on comparison logic, Boolean logic and/or fuzzy logic, the present invention performs a selected activity, such as dialing a telephone number for establishing a two-way communications link and/or outputting a control signal for controlling a peripheral device connected to the present invention. The predetermined condition or set of conditions can be fixed, dynamic or calculated based on recorded and/or sensed data. Preferably, the two-way communications link is, for example, a voice, video and/or data link, between the present invention and the selected predetermined location.

Figure 1:
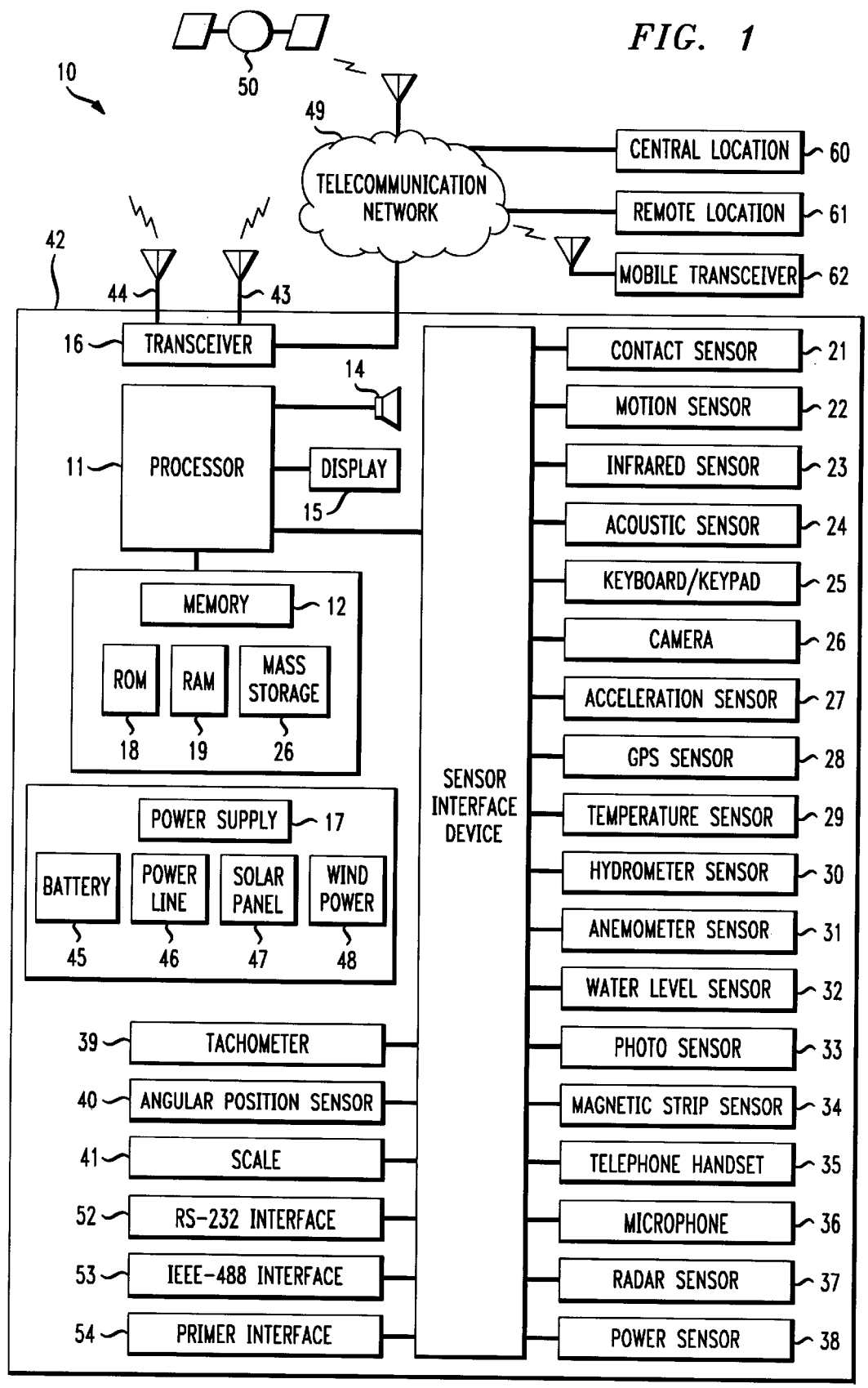
FIG. 1 shows a schematic block diagram of a communications platform system according to the present invention.

FIG. 1 shows a schematic block diagram of a communications system 10 according to the present invention. System 10 includes a processor 11 that is coupled to a memory 12, a sensor interface device 13, a speaker 14, a display 15, a transceiver 16 and a power supply 17. Processor 11 can be embodied as a well-known microprocessor or microcontroller having functional capabilities suitable for performing the monitoring and processing functions provided by the present invention. Processor 11 is capable of producing audio signals that are output to speaker 14 for generating announcements and messages. Alternatively, system 10 can include dedicated components that are under control of processor 11 for generating an audio signal. Processor 11 is capable of generating information signals that are displayed by display 15, such as a Liquid Crystal Display (LCD), for locally communicating information to a user in a well-known manner. Additionally, processor 11 can generate control signals in accordance with the monitoring and processing functions for controlling a peripheral device connected to system 10.

Memory 12 includes a read-only memory (ROM) 18, a random-access memory (RAM) 12 and, in some configurations, can include a mass storage device 20, such as a magnetic or optical disk drive. ROM 18 contains program instructions that are executed by processor 11 in a well-known manner for initializing and sustaining system overhead and monitoring functions. RAM 19 contains program instructions that are customized for specific monitoring functions provided by system 10, in addition to storing data recorded by system 10. Program instructions and commands can be downloaded in a well-known manner by system 10 over a communications link, through a communications port, such as an RS-232 port 52 or an IEEE-488 bus port 53, or can be entered through a keyboard/keypad device 25. Downloaded program instructions and command are stored in RAM 19 so that specific parameters monitored and functions performed by system 10 can be easily reconfigured. Mass storage device 20 can also be used for storing program instructions and commands in a well-known manner, and for storing data recorded by system 10 for uploading to a selected predetermined location.

Sensor interface device 13 interfaces processor 11 to a variety of different types of sensors and peripheral devices in a well-known manner, thus providing system 10 with a modular construction and with simple sensor installation and reconfiguration. In this regard, sensor interface device 13 can support multiple well-known protocol standards for bidirectionally interfacing different sensor types to processor 11. For example, the types of sensors and peripheral devices that can be interfaced through sensor interface device include a contact sensor 21, a motion sensor 22, an infrared sensor 23, an acoustic sensor 24, a keyboard/keypad 25, a camera 26, an acceleration sensor 27, a Global Positioning System (GPS) sensor 28, a temperature sensor 29, a hydrometer sensor 30, a wind-speed sensor 31, a water level sensor 32, a light sensor 33, a magnetic strip sensor 34, a telephone handset 35, a microphone 36, a radar sensor 37, a powerline sensor 38, a tachometer 39, an angular position sensor 40, such as a synchro-resolver, a scale 41 for measuring weight, and a printer connector 54. Of course, other sensors can be interfaced to processor 11 through sensor interface device 13, and sensor interface device 13 can be embodied as a plurality of sensor interface devices that each support well-known protocol standards for bidirectionally interfacing different sensor types to processor 11. Each sensor type is selected for monitoring a specific parameter of an entity so that a desired condition or a set of conditions are detected by system 10. While sensors and peripheral devices 21–41 and 54 are shown as being contained within a single housing 42, selected sensors can be configured to be positioned remotely from housing 42 so that desired parameters are properly and reliably detected and monitored by system 10.

Transceiver 16, under control of processor 11, establishes a two-way wireless communications link between system 10 and a selected predetermined location through a telecommunications network 48 by way of an antenna 43. Preferably, transceiver 16 forms the two-way communications link as a cellular or a Personal Communication System (PCS) terminal using, for example, the AT&T Wireless Short Message Service (SMS). For example, transceiver 16 establishes a two-way wireless communications link between system 10 and a central location 60, a remote location 61 or a mobile transceiver 62 through telecommunications network 49. The particular location with which system 10 establishes a two-way communications link depends upon the particular conditions detected by system 10 and particular logic programmed into memory 12. For example, when a first condition is detected, system 10 establishes a communications link with central location 60, such as a central processing center, for uploading metrology data stored in memory 12. When a second condition is detected, system establishes a communications link with remote location 61, such as a field office, for transmitting metrology data and/or images in real time, for example, to remote location 61. When yet a third condition is detected, system 10 establishes a two-way communications link with mobile transceiver 62, which is located with a law enforcement or security officer on patrol, for alerting mobile transceiver 62 that the third condition has been detected.

In some configurations of system 10, an antenna 44 that is remotely located from system 10 can be used for optimizing reception of the communications link. Alternatively, antenna 43 or antenna 44 can establish a two-way communications link over a satellite-based communications system 50. When system 10 determines that a wireless link is unavailable, whether via a cellular-type network or a satellite-based network, system 10 can establish a two-way wireline communications link 51 with a selected predetermined location through telecommunications network 49.

Operating power is supplied to system 10 by power supply 17. Preferably, power supply 17 includes a battery power supply 45 so that system 10 can reliably operate remotely and independently in locations where a powerline is unavailable or intermittent and a device for recharging battery power supply 45, such as a powerline 46, a solar power supply device 47 and/or a wind power supply device 48. Alternatively, power supply 17 can provide operating power to system 10 primarily from powerline 46, in which case battery power supply 45, solar power supply device 47 and/or wind power supply device 48 provide backup power supply features in a well-known manner.

In operation, system 10 autonomously monitors a desired parameter or set of parameters by receiving inputs from sensors that have been selected for monitoring the desired parameters. Depending upon the specific conditions detected, one of a plurality of telephone numbers can be dialed by system 10 and/or an appropriate control signal is output for controlling a peripheral device connected to system 10. Further, system 10 can support multiple applications by interfacing with a plurality of different sensors and peripheral devices for monitoring a plurality of diverse parameters and/or performing appropriate control functions.

Figure 2:
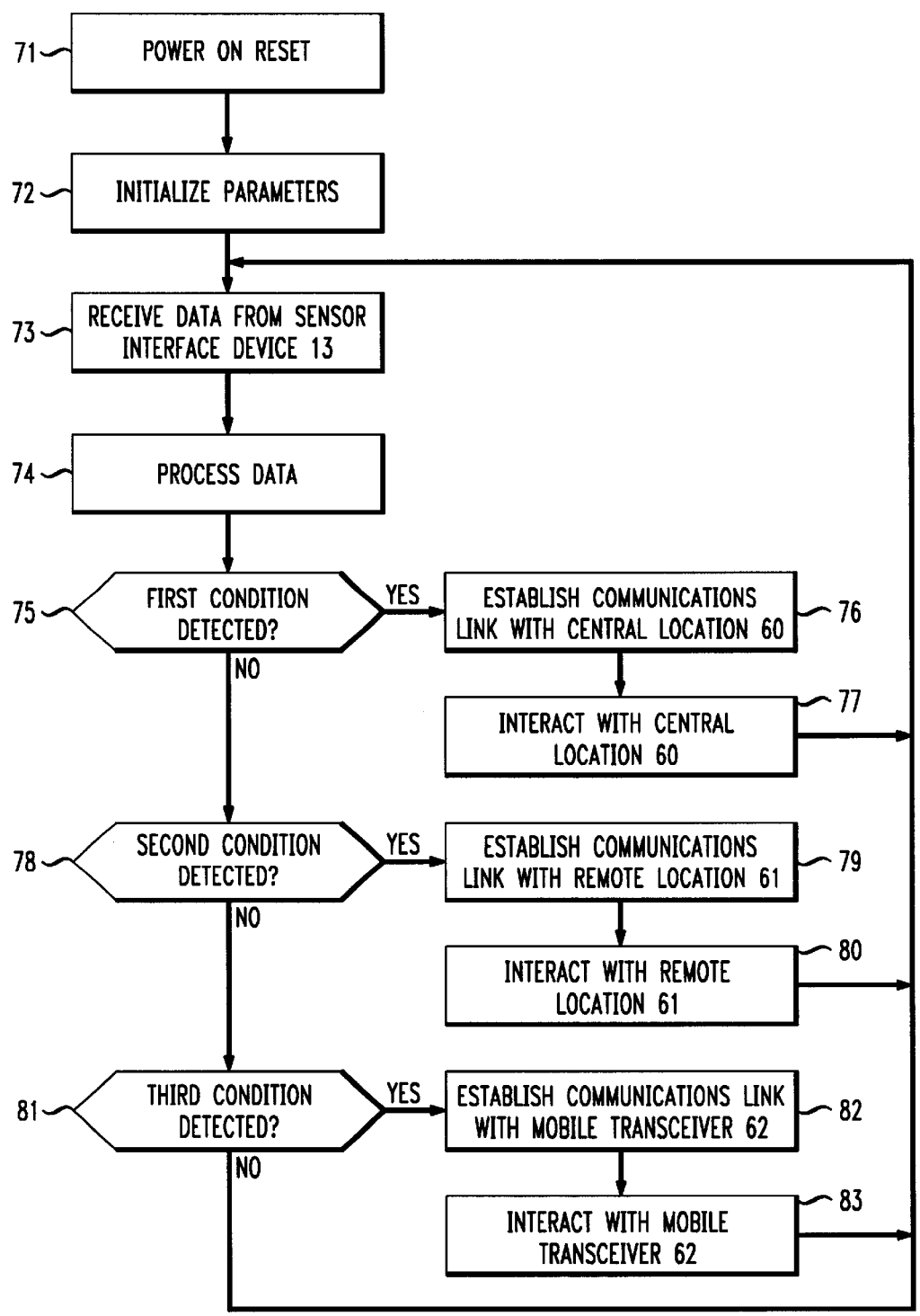
FIG. 2 shows an operational flow diagram for the communications platform system according to the present invention.

FIG. 2 shows an exemplary operational flow diagram 70 for a communications system 10 according to the present invention. While flow diagram 70 shows an operational process for establishing a two-way communications link between a central location 60, a remote location 61 and a mobile transceiver 62 based on exemplary detected conditions, the present invention can be configured for establishing a two-way communications link with a selected one of a plurality of locations of any type. For example, system 10 can be configured for establishing a two-way communications link with one of a plurality of remote locations based on a specific detected condition of a class of conditions. When a specific condition of another class of conditions is detected, system 10 establishes a two-way communications link to, for example, a selected mobile transceiver of a plurality of mobile transceivers.

At step 71, power is applied to system 10. At step 72, parameters used by system 10 are initialized in a well-known manner. At step 73, system 10 receives data through sensor interface device 13. At step 74, received data is autonomously processed in accordance with program instructions stored in memory 12. For example, selected data received from sensor interface device 13 is recorded in RAM 19 or in mass storage device 20. The program instructions stored in memory 12 can be a Boolean and/or a fuzzy logic algorithm that is performed by processor 11 for determining whether a predetermined condition or set of conditions exists or has occurred. According to the present invention, the predetermined condition or set of conditions can be fixed, dynamic or calculated based on specific data received from sensor interface device 13.

At step 75, system 10 determines whether a first condition is detected. For example, the first condition can be the expiration of a predetermined time period used for determining when to upload data stored in memory 12 on a scheduled basis. If so, flow continues to step 76 where processor 11 provides dialing instructions to transceiver 16 for establishing a two-way communications link with central location 60. At step 77, system 10 interacts with central location 60 in accordance with program instructions stored in memory 12. For this example, processor 11 sends information to central location 60 that is indicative that a scheduled data upload should occur. Central location 60 can respond, for example, by sending commands to system 10 to begin uploading data stored in RAM 19 or in mass storage device 20. Alternatively, system 10 can automatically interact with central location 60 without receiving commands from central location 60. Once system 10 is done interacting with central location 60, flow continues to step 73 where data is received from sensor interface device 13.

If the first condition has not been detected by system 10 at step 75, flow continues to step 78 where system 10 determines whether a second condition has been detected. If so, flow continues to step 79 where processor 11 provides dialing instructions to transceiver 16 for establishing a two-way communications link with remote location 61. At step 80, system 10 interacts with remote location 61 in accordance with program instructions stored in memory 12. For example, processor 11 sends information to remote location 61 that is indicative that the second condition has been detected. Remote location 61 can respond by sending selected commands to system 10 for interacting with system 10, or system 10 can automatically send selected data to remote location 61. For example, when the second condition is detected, an image recorded by camera 26 is transmitted to remote location 61 for viewing at remote location 61. Camera 26 can record a still image or the image can be a live image using well-known slow-scan techniques. Processor 11 can output control signals through sensor interface device 13 to camera 26, for example, for zooming in on an image or panning camera 26 for obtaining a better view of the image. Further, remote location 61 can send commands to system 10 for establishing a two-way multimedia communications link. Once system 10 is done interacting with remote location 61, flow continues to step 73 where data is received from sensor interface device 13.

If the second condition has not been detected by system 10 at step 78, flow continues to step 81 where system 10 determines whether a third condition has been detected. If so, flow continues to step 82 where processor 11 provides dialing instructions to transceiver 16 for establishing a two-way communications link with mobile transceiver 62. At step 83, system 10 interacts with mobile transceiver 62 in accordance with program instructions stored in memory 12. For example, processor 11 sends information to mobile transceiver 62 that is indicative that the third condition has been detected. Mobile transceiver 62 can respond by sending selected commands to system 10 for interacting with system 10, or system 10 can automatically send selected data to mobile transceiver 62. For example, a two-way multimedia communications link can be established for responding to the third condition. Once system 10 is done interacting with mobile transceiver 62, flow continues to step 73 where data is received from sensor interface device 13. If the third condition has not been detected at step 81, flow continues to step 73.

Appropriately configured, system 10 can be used for collecting and monitoring environmental data, for site surveillance, for monitoring a high-value asset or for monitoring a location that potentially can have vandalism or has had a history of vandalism, such as graffiti. Additionally, system 10 can be configured for remotely monitoring and counting pedestrian or vehicle traffic at a specific location for performing a traffic study or for monitoring access to a specific area. For example, as a reduced traffic flow condition along a highway is detected in the presence of normal weather conditions, system 10 establishes a two-way wireless communication link alerting a department of motor vehicles that specific conditions have been detected on the highway and two-way voice and/or visual communications can be established accordingly. The department of motor vehicles can issue traffic advisories for broadcast. When a reduced traffic flow condition is detected in the presence of adverse weather conditions, such as rain and/or freezing temperatures, for example, system 10 establishes a two-way communications link with a field office of the department of motor vehicles for uploading information relating to the detected conditions. The field office can respond accordingly by dispatching a crew for appropriately dealing with the weather conditions.

System 10 can also be configured as part of, for example, a vending machine using the vending interface protocol UDF, for example, for monitoring and controlling selected aspects of the vending machine. When a customer experiences a problem with the vending machine, for example, system 10 establishes a two-way wireless voice and/or visual communications link with a central location so that the problem can be addressed. Additionally, system 10 can include a magnetic strip sensor so that a customer can use a credit card for making a purchase. The two-way communication link is established in connection with the magnetic strip sensor can be with a central location 60 for obtaining authorization for accepting a credit card account used by the customer. System 10 can also be configured for monitoring inventory and/or security of a specific vending machine or a group of vending machines. Maintenance information can be recorded and transmitted to a remote location 61 on a scheduled and/or exception basis. System 10 can output commands for a vending machine to perform system diagnostics or initiate a system reset. Additionally, system 10 can include a touch-tone keypad and a handset, and be configured to provide pay telephone functions. Accordingly, when a key of the touch-tone keypad is actuated, processor 11 generates dialing signals for transceiver 16.

Yet another exemplary configuration of system 10 is for tracking and monitoring a shipping container. For this configuration, system 10 can include an acceleration sensor 27 for sensing shock forces applied to a shipping container, a GPS sensor 28 for sensing the position of the shipping container during transit, and sensors for monitoring environmental conditions both internal and external to the shipping container. System 10 can periodically establish a two-way wireless communication link for uploading recorded data. System 10 can be used for monitoring the progress of a shipment for just-in-time manufacturing purposes. Additionally, if the detected position of the shipping container deviates from an expected route, system 10 can alert a selected predetermined location of the detected route deviation.

While the present invention has been described in connection with the illustrated embodiments, it will be appreciated and understood that modifications may be made without departing from the true spirit and scope of the invention.

What is claimed is:

1. A system comprising:
    a sensor interface device configured to receive a sensor signal from each of a plurality of sensor controlled devices corresponding to a predetermined condition for each of the sensors;
    a processor, coupled to the interface, executing an algorithm, programmable from a remote location to actively monitor the different sensor controlled devices and responsive to the sensor signal whereby the algorithm performs at least one operation on the sensor signal and generates an output signal; and
    a transceiver responsive to the output signal for outputting a control signal for the sensor controlled devices and/or establishing a two-way wireless communications link via a telecommunications network with a selected one of a plurality of remote locations upon an occurrence of the predetermined condition determined according to the algorithm comparing the output signal to a reference value.

2. The system according to claim 1, wherein the two-way communications link is a two-way wireless communications link.

3. The system according to claim 2, wherein the two-way communications link is a cellular network communications link.

4. The system according to claim 2, wherein the two-way communications link is a personal communication system communications link.

5. The system according to claim 2, wherein the two-way communications link is a satellite system link.

6. The system according to claim 2, wherein the two-way communications link includes an audio communications link.

7. The system according to claim 2, wherein the two-way communications link includes a video communications link.

8. The system according to claim 1, further comprising a memory, and
    wherein the processor is further responsive to the sensor signal by storing information relating to the predetermined condition in the memory and by generating the output signal when an attribute of the predetermined condition equals the reference value in the algorithm.

9. The system according to claim 2, wherein the two-way communications link is an ISDN link.

10. The system according to claim 2, further comprising a memory, and
    wherein the processor is further responsive to the sensor signal by storing information relating to the monitored parameter in the memory and by generating the dialing signal when the monitored parameter equals a predetermined value.

11. The system according to claim 10, wherein the information relating to the predetermined condition stored in the memory is sent over the two-way communications link.

12. The system according to claim 1, further comprising a memory, and
    wherein the processor is further responsive to the sensor signal by storing information relating to the predetermined condition for each sensor in the memory, by periodically generating the output signal and by sending the information relating to the predetermined condition stored in the memory for each of the sensors over the communications link.

13. The system according to claim 12, wherein the information received over the two-way communications link includes program information executed by the processor.

14. The system according to claim 2, further comprising a memory, and
    wherein the processor is further responsive to the sensor signal by storing information relating to the predetermined condition in the memory, by periodically generating the dialing signal and by sending the information relating to the monitored parameter stored in the memory over the two-way communications link.

15. The system according to claim 2, wherein the processor generates the dialing signal by determining whether a predetermined condition exists, the predetermined condition related to the monitored parameter.

16. The system according to claim 15, wherein the predetermined condition is calculated by the processor based on the sensor signal.

17. The system according to claim 15, wherein the processor determines whether the predetermined condition exists based on fuzzy logic.

18. The system according to claim 15, wherein the processor determines whether the predetermined condition exists based on Boolean logic.

19. The system according to claim 2, wherein when a two-way wireless communications link is unavailable, the transceiver is responsive to the dialing signal by establishing a two-way wireline communications link with the telecommunications network.

20. The system according to claim 2, wherein information is received over the two-way communications link, the received information including announcement information, the system further comprising a speaker coupled to the processor, and wherein the processor is responsive to the announcement information by generating an announcement signal that is output to the speaker.

21. The system according to claim 2, wherein information is received over the two-way communications link, the received information including image information, the system further comprising a display device coupled to the processor, and wherein the processor is responsive to the image information by outputting an image signal to the display device.

22. The system according to claim 2, further comprising a keyboard input device coupled to the sensor interface device, the keyboard input device generating an input signal, and wherein the processor is responsive to the input signal by generating the dialing signal.

23. The system according to claim 2, further comprising a global positioning system sensor coupled to the sensor interface device.

24. The system according to claim 2, further comprising a camera coupled to the sensor interface device.

25. The system according to claim 2, further comprising an environmental sensor coupled to the sensor interface device.

26. The system according to claim 2, further comprising a magnetic strip reader coupled to the sensor interface device.

27. The system according to claim 2, wherein the system is part of a vending machine.

28. The system according to claim 27, wherein the system further comprises a telephone handset coupled to the sensor interface device; and a touch-tone keypad coupled to the sensor interface device.

29. The system according to claim 2, further comprising a traffic monitor coupled to the sensor interface device.

30. A method comprising the steps of:

receiving a sensor signal at a sensor interface configured for each of a plurality of sensors corresponding to a monitored parameter for each of the sensors;

programming a processor from a remote location to execute an algorithm and actively monitor the different sensors whereby the algorithm performs at least one operation on the sensor signal;

generating an output signal in response to the algorithm; and outputting a control signal for the sensor controlled devices and/or;

establishing a two-way wireless communications link via a telecommunications network with one of a plurality of remote locations responsive to the sensor signal and the monitored parameter according to the algorithm using conditional logic.

31. The method according to claim 30, wherein the two-way communications link is a two-way wireless communications link.

32. The method according to claim 31, wherein the two-way communications link is a cellular network communications link.

33. The method according to claim 31, wherein the two-way communications link is a personal communication system communications link.

34. The method according to claim 31, wherein the two-way communications link is a satellite system link.

35. The method according to claim 31, wherein the two-way communications link includes an audio communications link.

36. The method according to claim 31, wherein the two-way communications link includes a video communications link.

37. The method according to claim 31, wherein the two-way communication link includes a data link.

38. The method according to claim 31, wherein the two-way communications link is an ISDN link.

39. The method according to claim 31, further comprising the step of storing information relating to a predetermined condition in a memory for each of the sensors, and wherein the step of generating the dialing signal occurs in response to when an attribute of the predetermined condition for one of the sensors equals a predetermined value, according to the algorithm comparing a monitored signal to the predetermined value.

40. The method according to claim 39, further comprising the step of sending the information relating to the predetermined condition stored in the memory over the communications link.

41. The method according to claim 39, further comprising the steps of:

receiving information over the two-way communications link; and storing the information received over the two-way communications link in the memory.

42. The method according to claim 41, wherein the information received over the two-way communications link includes program information executed by a processor.

43. The method according to claim 31, further comprising the steps of:

storing information relating to the monitored parameter in a memory;

periodically generating the dialing signal; and sending the information relating to the monitored parameter stored in the memory over the two-way communications link.

44. The method according to claim 31, wherein the step of generating the dialing signal includes the step of determining whether a predetermined condition exists, the predetermined condition relating to the monitored parameter.

45. The method according to claim 44, wherein the step of determining whether the predetermined condition exists includes the step of calculating the predetermined condition based on the sensor signal.

46. The method according to claim 44, wherein the step of determining whether the predetermined condition exists is based on fuzzy logic.

47. The method according to claim 44, wherein the step of determining whether the predetermined condition exists is based on Boolean logic.

48. The method according to claim 31, wherein when a two-way wireless communications link is unavailable, the step of establishing a two-way communications link with the telecommunications network includes the step of establishing a two-way wireline communications link with the telecommunications network.

49. The method according to claim 31, further comprising the steps of:
   receiving announcement information over the two-way communications link; and
   generating an announcement signal, the announcement signal being related to the announcement information.

50. The method according to claim 31, further comprising the steps of:
   receiving image information over the two-way communications link; and
   generating an image signal, the image signal being related to the image information.

51. The method according to claim 31, further comprising the steps of:
   receiving an input signal from a keyboard input device; and
   generating the dialing signal in response to the input signal.

52. The method according to claim 31, wherein the sensor signal is received from a global positioning system sensor.

53. The method according to claim 31, wherein the sensor signal is received from a camera.

54. The method according to claim 31, wherein the sensor signal is received from an environmental sensor.

55. The method according to claim 31, wherein the sensor signal is received from a magnetic strip reader.

56. The method according to claim 31, wherein the sensor signal is received from a traffic monitor.

57. In a sensor based, two way communications platform including a processor system linked to peripheral devices via a sensor interface and a plurality of remote reporting locations via telecommunication network, a method for autonomously monitoring a plurality of peripheral device sensors via the interface for predetermined conditions and performing a selected activity when a predetermined condition is detected, comprising the steps of:
   initializing parameters in the processor system from at least one of remote reporting location for monitoring the sensors and establishing two-way communication with the remote reporting locations;
   programming the processor from a remote reporting location to actively monitor different entities;
   receiving data from the sensors via the sensor interface;
   processing the received data in accordance with an algorithm stored in the processor system;
   determining whether a first predetermined condition has been detected for the sensors;
   outputting a control signal for the peripheral devices and/or establishing a two way communication between the processor system and one of the remote reporting locations for reporting the detected first predetermined condition according to the algorithm; and
   conducting an interaction between the processor system and one of the remote locations to resolve the detected first predetermined condition.

58. The method of claim 57 further comprising the step of determining whether a second predetermined condition has been detected for the sensors.

59. The method of claim 57 further comprising the step of:
   determining whether a third predetermined condition has been detected for the sensors according to the algorithm.

60. The method of claim 58 further comprising the step of:
   reporting and resolving the detected second predetermined condition to a second remote reporting location.

61. The method of claim 59 further comprising the step of:
   reporting and resolving the detected third predetermined condition to a third remote reporting location.

62. The method of claim 57 further comprising the step of:
   receiving data from the sensor interface after each predetermined condition has been detected, reported and resolved by one of the remote reporting locations.

63. The method of claim 57 further comprising the step:
   detecting a variable condition using fuzzy logic in the algorithm and reporting the detection to one of the remote reporting locations.

64. The method of claim 57 wherein the first predetermined conditions may be dynamic or calculated based on recorded and/or sensed data.

65. A sensor based, two way communications platform, comprising:
   a processor system linked to peripheral devices via a sensor interface and a plurality of remote reporting locations via telecommunication network,
   means for initializing parameters in the processor system from at least one of remote reporting location for monitoring the sensors and establishing two-way communication with the remote reporting locations;
   means for programming the processor from a remote reporting location to actively monitor different entities;
   means for receiving data from the sensors via the sensor interface;
   means for processing the received data in accordance with an algorithm stored in the processor system;
   means for determining whether a first predetermined condition has been detected for the sensors;
   means for outputting a control signal for the peripheral devices and/or establishing a two way communication between the processor system and one of the remote reporting locations for reporting the detected first predetermined condition according to the algorithm; and
   means for conducting an interaction between the processor system and one of the remote locations to resolve the detected first predetermined condition.

* * * * *